Figure 1:
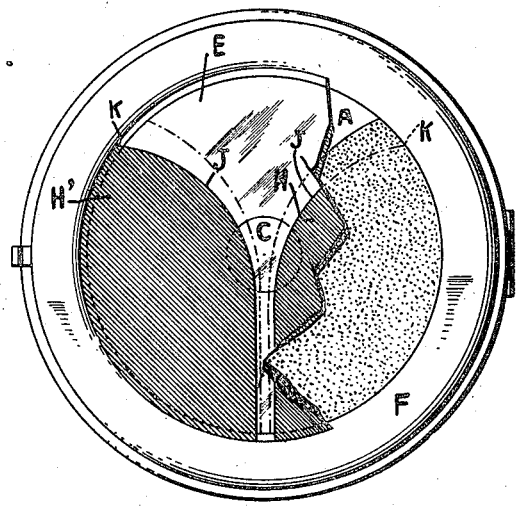

J. D. PARK.
NON-GLARE PROJECTING HEADLIGHT.
APPLICATION FILED MAY 29, 1917.

1,295,582. Patented Feb. 25, 1919.

UNITED STATES PATENT OFFICE.

JAMES DINWOODIE PARK, OF DULUTH, MINNESOTA, ASSIGNOR OF ONE-HALF TO ALBERT H. ACKERMAN, OF CLEVELAND, OHIO.

NON-GLARE PROJECTING-HEADLIGHT.

1,295,582.  Specification of Letters Patent.  Patented Feb. 25, 1919.

Application filed May 29, 1917. Serial No. 171,605.

*To all whom it may concern:*

Be it known that I, JAMES DINWOODIE PARK, a citizen of the United States, and residing at Duluth, in the county of St. Louis and State of Minnesota, have invented a new and Improved Non-Glare Projecting-Headlight, of which the following specification is a full disclosure.

This invention relates to automobile lamps of the projecting type and it deals more particularly with a construction thereof designed to reduce the glare thereof.

Some millions of automobiles have gone into use. The demand for better illumination for night-driving has been met by a steady increase in the candle-power of the headlights, but without any essential alterations in the geometrical structure of them. The true parabola has persisted as the reflector, notwithstanding it throws about as much light above the road, as onto it. However, the driver has been satisfied because he could better see the road because of the increased candle-power. But with this betterment, came a new difficulty—the glare of the other man's car. The light rays that his parabola did not project onto the road were projected into the eyes of the approaching driver. This inefficiency is thus compounded for it means glare. Glare means blindness and blindness may mean injury.

In accordance with this invention, it is proposed to so construct the reflector or lens of the lamp, in place of the usual glare-producing beam (which, in the absence of curative means is directly projected by the lower half of the reflector in the form of a solid beam,) as to identically preserve only so much of this glare-creating beam as constitutes a vertical sheet of light; the other portions of the road beam being either diffused or scattered or else otherwise deflected out of any possible line of the eyes of a person facing the car. By reason of the character of the new beam projected by this novel lamp construction, the driver is provided not only with a very ample illumination of the road immediately in front of the car, but also with a strong concentrated beam for lighting more distant portions of the road; said beam also serving to warn drivers on a cross street of the fact that another automobile is approaching transversely. From the standpoint of the pedestrian, this light is wholly satisfactory since by reason of its narrowness, it will be objectionable only for very short periods because a slight relatively lateral motion between the pedestrian and automobile will suffice to direct the beam out of line with the eye. In practice, this lamp has proven to be very satisfactory and to operate as stated.

Other objects will be in part obvious from the annexed drawings and in part indicated in connection therewith by the following analysis of this invention.

This invention consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 2:
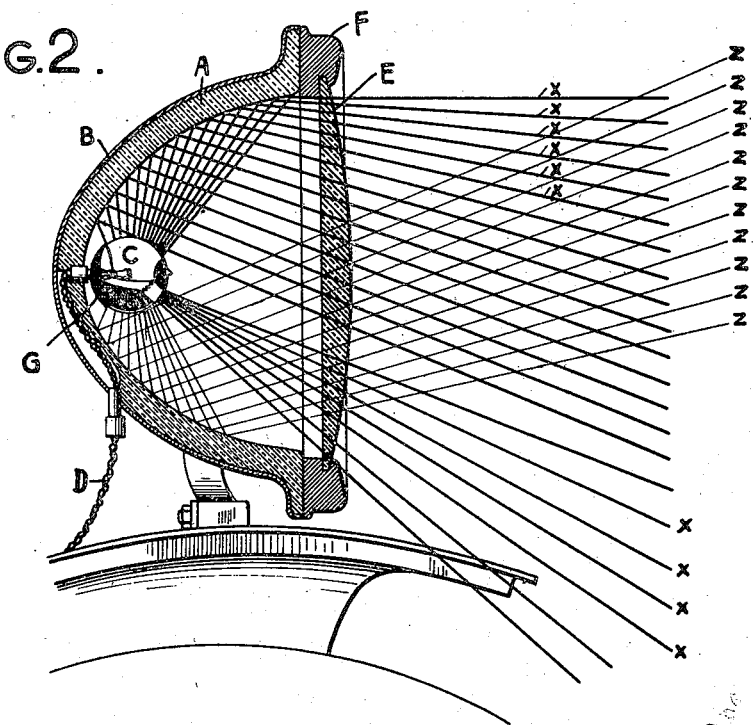

Figure 1 is a front view of the lamp equipped with this invention. Fig. 2 is an explanatory perspective exemplifying the nature of the conventional beam as modified by this improvement.

Continuing now by way of a more detailed analysis of this invention, it may be stated that the glare of an ordinary automobile lamp proceeds mainly from the lower half of the reflector. In no case do the rays proceed truly in parallelism, but there is always more or less dispersion and it is probably due very largely to this dispersion that such lights are so prone to create a glare in the eyes. In accordance with this theory, many devices have been proposed for entirely cutting off the rays from reaching the lower half of the main reflector, or for entirely modifying all of said rays after being reflected by the lower portion of said main reflector. An objection to the former is that a projected beam is not sufficiently deep in a vertical direction to be very apparent to a person on a cross street, and an objection to the other is that none of the rays of the lower half enter into the position of a beam proper but rather are entirely diffused.

Referring to the drawings, which are largely diagrammatic in character, the main reflector of the lamp is indicated by A and in accordance with conventional practice assumes the form of a parabola. This reflector may of course be either of polished metal or of glass contained with in a suitable case B and arranged within the features of the parabola is the filament of an electric lamp C which is suitably secured to the lamp at or about its axis and receives current from a source of electricity through the wires D. The front of the lamp may be closed either by a flat sheet of glass or by a lens E preferably mounted in a swinging bezel F hinged to the body of the lamp. The rays given off by the upper half of the filament strike the upper half of the reflector and are then projected in the paths approximately indicated by the characters x—x—x—x—x. These rays are wholly useful in that they give rise to very little blinding effect, but, as the rays from the lower half of the filament would proceed in a converse manner it will be perceived that they would be thrown into the eye and would produce the well-known glare. In accordance with this invention, only a narrow vertical strip of the lower reflector is enabled to project the rays without any interference or modification. This produces a narrow vertical beam composed of the rays z—z—z—z which may be about an inch thick so that while it is sufficiently effective for the purposes of remote road illumination it nevertheless does not create any pronounced blinding or glare.

The remaining regions of the lower portion of the reflector are rendered ineffective or modified in action so that the rays going therefrom are diffused into the nearby portions of the road. This result may be achieved either by employing a hemi-spherical reflecting shield G affixed to the electric bulb so as to be interposed between the source of light and the corresponding regions to be cut off from the lower portion of the reflector; or by stippling the front lens of the lamp indicated by the regions H and H'; or by stippling the corresponding regions of the main reflector itself. The term stippling as herein applied comprehends the various expedients resorted to for the purpose of diffusing light rays such as rendering the surface of the glass or of the reflector warty or by applying thereto a translucent pigment which may be colored if desired.

As shown best by Fig. 1, the region of the reflector which has its action modified or nullified in accordance with this invention falls below the curved border or division line J, extending from just above the source of light and rising in the form of a convex curve to terminate at the elevated point K on either side of the source of light. This yields a funnel-form region of the primary reflector capable of use without modification so as to project a beam of this description; the other portions merely casting off lights more or less diffused.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure the following combinations of steps and elements, or equivalents thereof, by Letters Patent of the United States:

1. A projecting lamp of the nature disclosed combining a source of light, and a reflector therefor having an effective parabolic Y-shaped reflecting surface the stem of which extends below the source of light.

2. A projecting lamp combining a source of light; a parabolic reflector therefor; and means for modifying the action of all portions of said reflector save the Y-shaped region thereof.

3. A projecting lamp combining a source of light; means for projecting rays from said light substantially in parallelism; and means for so intercepting such portions of said rays that the resultant beam will be approximately Y-shaped in cross section.

In witness whereof I hereunto subscribe my name as attested by the two subscribing witnesses.

JAMES DINWOODIE PARK.

Witnesses:
 MARIE OLSEN,
 J. A. TUCKER.